Feb. 3, 1942.   J. GOULDBOURN ET AL   2,271,548
CLUTCH
Filed Feb. 8, 1940   3 Sheets-Sheet 1
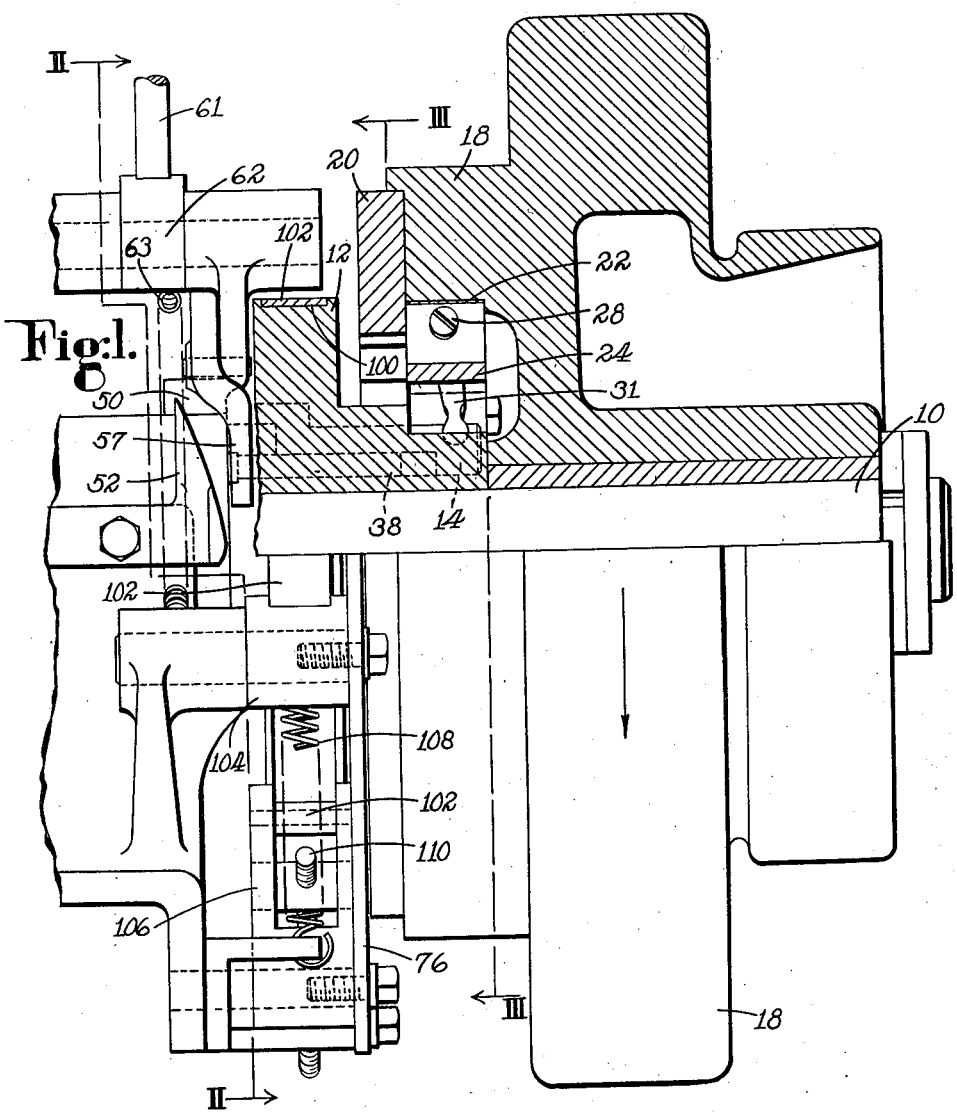
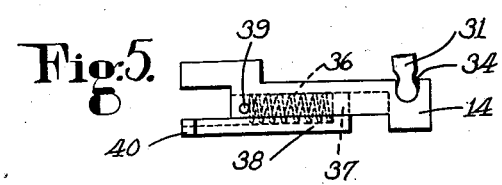

Feb. 3, 1942.   J. GOULDBOURN ET AL   2,271,548
CLUTCH
Filed Feb. 8, 1940   3 Sheets-Sheet 2

INVENTORS
Joseph Gouldbourn
Frank B. Keall
By their Attorney
Victor Cobb.

Feb. 3, 1942. J. GOULDBOURN ET AL 2,271,548
CLUTCH
Filed Feb. 8, 1940 3 Sheets-Sheet 3
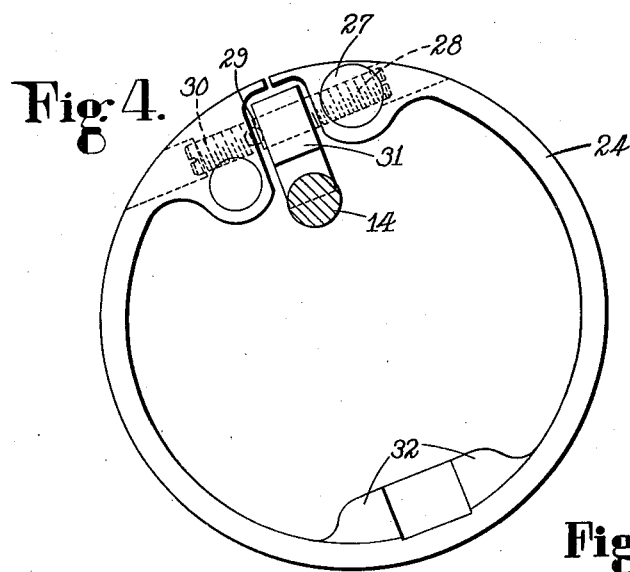
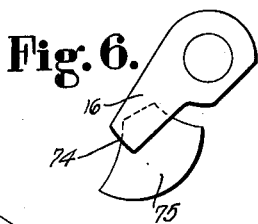
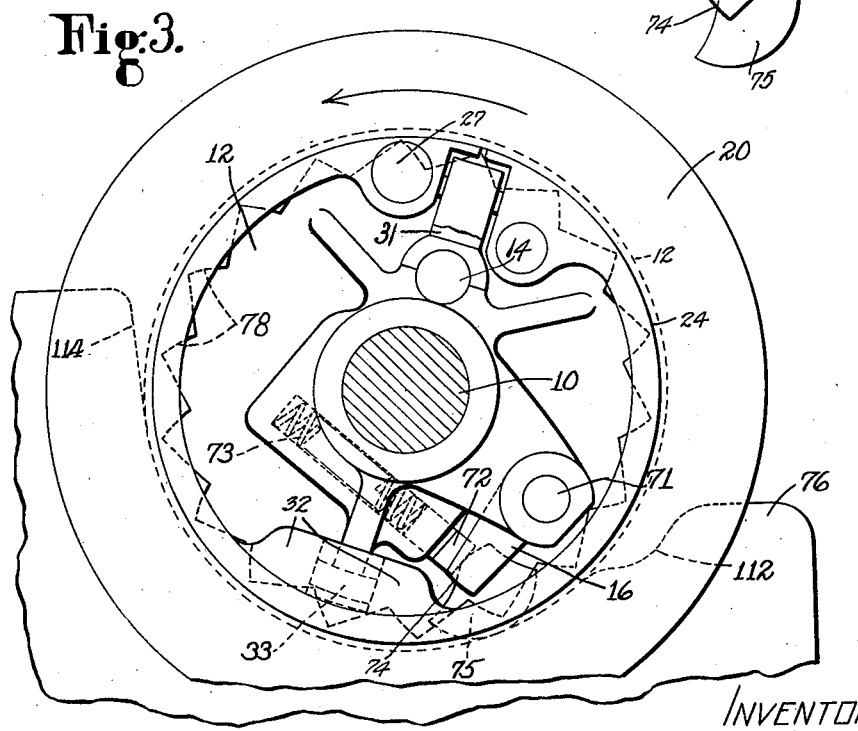
INVENTORS
Joseph Gouldbourn
Frank B. Keall
By their attorney
Victor Cobb Patented Feb. 3, 1942

2,271,548

UNITED STATES PATENT OFFICE 2,271,548

CLUTCH

Joseph Gouldbourn and Frank Bycroft Keall, Leicester, England, assignors to United Shoe Machinery Corporation, Borough of Flemington, N. J., a corporation of New Jersey Application February 8, 1940, Serial No. 317,860
In Great Britain February 27, 1939

9 Claims. (Cl. 192—53)

This invention relates to improvements in clutches and is illustrated herein as embodied in a clutch mechanism for a cutting out press of the class commonly used in boot and shoe manufacture for cutting parts of leather and other sheet material by shaped knives or dies placed on the material supported on a bed of the press and driven through the material by a blow from a reciprocating beam of the press. One type of machine of the above class is known as the clicking machine and has a beam which is manually swingable about a vertical pivot, over a block which forms the press bed. An example of a machine of this type is described in United States Letters Patent No. 921,503, granted May 11, 1909, on an application of Arthur Bates. In this machine a handle, by which the beam may be swung, is movable relatively to the beam to throw into operation a single revolution clutch which automatically disconnects itself after reciprocating the beam once.

In commercial practice, clicking presses as well as other presses of the class above indicated, are usually driven by single revolution friction clutches which have proved effective to start the presses without undue shock and to give sufficiently powerful drive to cut most work handled in the presses, but impose a more or less definite limit to the size and thickness of the work which can be cut without liability of "stalling" the press.

It is an important object of the present invention to provide a driving mechanism for presses which, while easily starting substantially massive parts from rest, will also impart a drive more powerful than is usually obtained by a friction clutch to those parts at the time when the actual pressing or cutting of the work is being performed.

The illustrative construction, which constitutes a preferred embodiment of the invention and which will be hereinafter described in detail, comprises a press driving mechanism which includes both a friction clutch and a positive drive clutch arranged to be engaged in succession.

A feature of the invention consists in automatic means for controlling the engagement and disengagement of the clutches and more particularly in such means for engaging the positive drive clutch at a predetermined time in the cycle of operations of the machine.

An additional feature of the invention consists in an arrangement whereby the frictional clutch is disengaged momentarily during the time that the positive clutch is becoming engaged so that there will be suitable slow relative rotation between the parts of the positive clutch to bring them into such a position as to assure their proper engagement with but little shock.

The above and other of the various objects and the several features of the invention will become clear from the following description given by way of example and not of limitation and with reference to the accompanying drawings of the illustrative construction referred to above.

In the drawings,

Fig. 1 is a side view, partly in vertical section, of the end of a shaft of a press with the said illustrative clutch mechanism mounted upon it;

Fig. 3 is a sectional view on the line III—III of Fig. 1 looking in the direction of the arrows;

Fig. 4 shows a friction ring of the clutch mechanism;

Fig. 5 is a side view of a sliding bolt which actuates the ring of Fig. 4, and

Fig. 6 is a detail of the pawl that forms the positive driving connection.

Figure 2:
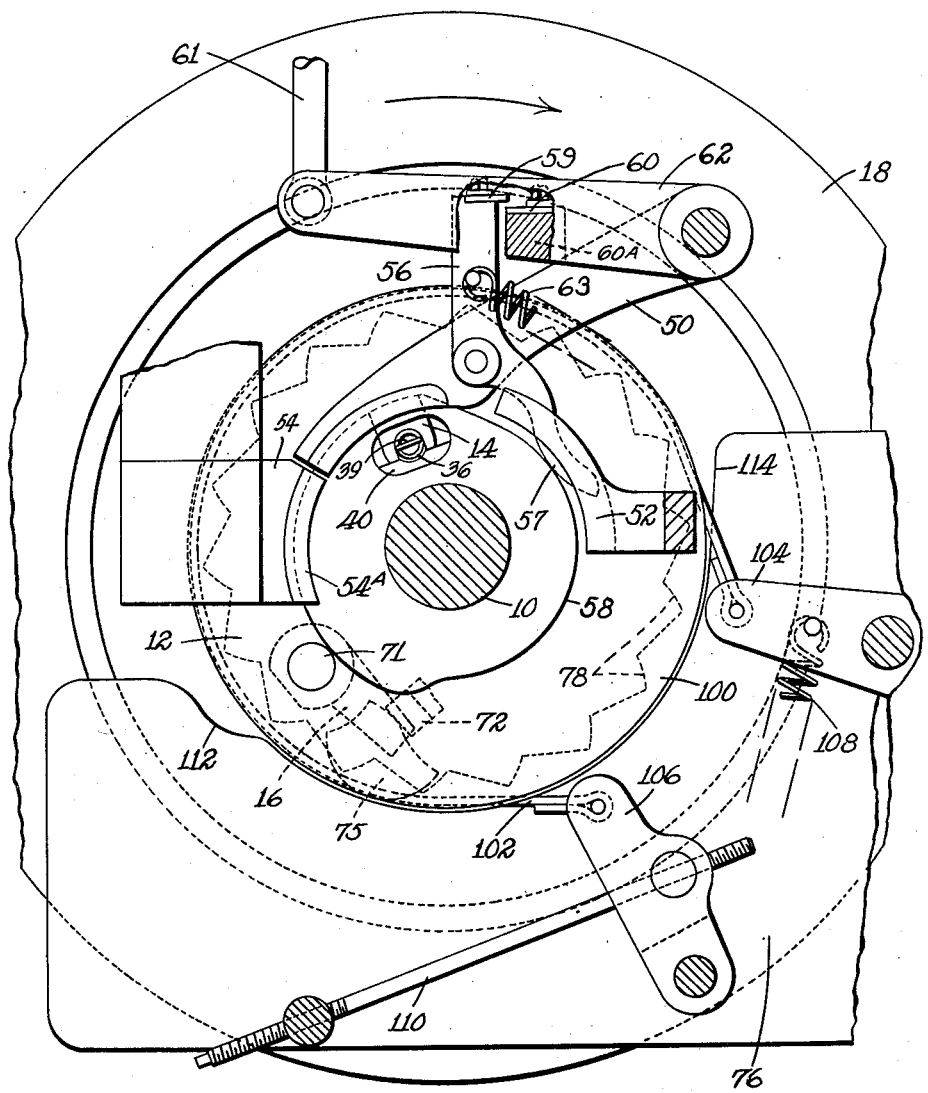
Fig. 2 is a sectional view on the line II—II of Fig. 1 looking in the direction of the arrows.

Referring to the drawings, the main shaft 10 of the press, which will be assumed to be of the type described in the patent referred to above, carries fixed to it a hub member 12 on which are mounted a sliding bolt 14 and a pivoted pawl 16. The driving member is a constantly driven fly wheel 18 which carries an internally toothed ring 20, with which the pawl 16 cooperates, the pawl acting as a strut to form a positive drive clutch. The fly wheel 18 also carries a smooth internal drum surface 22 against which a split, expansible friction clutch ring 24 carried by the hub, is arranged to be expanded to cause engagement of the friction clutch.

The friction clutch portion of the mechanism will first be described. To expand the ring 24 (Fig. 4) its ends are forced apart by a screw mechanism, in the following manner. A swivel pin 27 is mounted in a bore in one end of the ring, the bore being parallel to the axis of the ring. A screw 28 is threaded into a transversely tapped hole in the swivel pin. On the opposite end of the screw 28 is a cup-shaped depression in which is seated an abutment ball 29. In order that it can serve as an abutment, the ball is supported on its opposite side by a corresponding depression in an adjusting screw 30, which screw is mounted in a tapped hole in the opposite end of the ring 24. Integral with the screw 28, and at right angles thereto, is a lever 31 which, when rocked parallel to the shaft 10, will rotate the screw 28 in the swivel pin 27. In view of the support offered by the abutment ball 29, rotation of the screw forces the ends of the ring 24 apart to cause it frictionally to engage the drum surface 22 on the driving pulley 18. The amount of pressure exerted by this expansion, and the amount of power that can be transmitted by this, the friction portion of the clutch, may be adjusted by means of the adjusting screw 30. The ring 24 is held on the hub 12, so as to rotate with it, by the engagement of two lugs 32 on the ring with the sides of a projection 33 (Fig. 3) on the hub.

The lever 31 is rocked by the sliding bolt 14, mentioned above, a notch 34 in the bolt engaging the end of the lever. The sliding bolt 14 is mounted in a bore in the hub 12 and, as shown best in Fig. 5, is pressed in one direction by a spring 36 which is held in compression between a lug 37 on a carrier strip 38 and a pin 39 on the bolt. The carrier strip is held against axial movement in the bore in the hub 12 by a projection 40 which seats against a recess in the hub.

Pressure of the spring 36 tends to produce a sliding movement of the sliding bolt 14, in a direction which would expand the clutch ring. This sliding movement is controlled at different times in every revolution by a manually movable tripping lever 50 and two cam blocks 52, 54 fixed to the machine frame (see Fig. 2).

The tripping lever 50 has pivoted to it a latching lever 56 which has a tail piece 57 arranged to engage a cam 58 on the hub 12 and has a projecting trip plate 59 at its upper end. In Fig. 2, the trip plate 59 is shown in engagement with another trip plate 60, mounted on an offset 60A on an arm 62 freely pivoted on the same shaft as the lever 50. With the parts in this condition, the left end of the bolt 14 is pressed by the spring 36 against the lower end of the lever 50. When the rod 61 is lifted by its connection to a starting handle, the trip plate 60, which is then underneath the trip plate 59, lifts the plate 59 and this, through the lever 56, lifts the lever 50 and allows the spring 36 to slide the bolt 14 to the left (Figs. 1 and 5) causing it to move the lever 31 in the direction to expand the band 24 into engagement with the flywheel 18, or, in other words, to cause engagement of the friction clutch. The shaft 10 will then begin to rotate (in the direction of the arrow on the fly wheel 18, as shown in Fig. 2) and the rise of the cam 58 will lift the tail piece 57 and cause disengagement of the trip plates 59 and 60. A spring 63 connecting the lever 56 to the machine frame then causes the tripping lever 50 to return to its original position (after the tail piece 57 has passed off from the rise of the cam 58) in readiness to engage the sliding bolt 14 near the end of a revolution, and the trip plates 59 and 60 cannot be reengaged until the rod 61 has been allowed to fall by a release of the starting handle by the operator to allow the trip plate 59 to swing to a position above the trip plate 60.

Referring now to the positive clutch portion of the mechanism, the pawl 16, as shown in Fig. 3, is freely pivoted on a stud 71 on the hub 12 and is urged to swing outwardly radially of the shaft 10 by a plunger 72 mounted to slide in a bore in the hub and pressed by a spring 73. The pawl 16 carries at one side of its tooth engaging end 74, an extension 75 which has a curved outer surface adapted to engage the edge of a cam plate 76 which is fixed to the frame of the machine. Through this engagement, the cam plate controls the position of the pawl 16 at different times in a revolution of the shaft 10, at one time allowing the plunger 72 to push the end 74 of the pawl 16 into the path of the teeth 78 of the ring 20, causing the pawl to act as a strut between its pivot 71 on the driven hub 12 of the machine shaft 10 and one of the teeth 78 on the ring 20 of the driving fly wheel 18 to produce a positive clutching of the shaft 10 to the fly wheel 18. At another time the cam plate 76 forces the pawl out of engagement. Both of these operations will be described later.

As may be seen in Figs. 1 and 2, the hub 12 is provided with a brake drum 100 in contact with which a brake band 102 is constantly held to provide sufficient friction to stop the shaft 10 and hub 12 when both clutches are disengaged, without, however, substantial resistance to movement of the shaft under the actuation of the clutches.

The ends of the band 102 are connected to two short links 104, 106 pivoted on the machine frame. The link 104 is pulled by a spring 108 connected to the frame to tighten the band 102 on the drum 100 and the link 106 is provided with a threaded brake pressure adjusting rod 110.

The above friction and positive clutch mechanisms operate in the following manner. Referring to Fig. 2, the parts are shown in starting and stopping position. As has been indicated, lifting of the lever 50 causes the friction clutch to become engaged. Such engagement is effective for only a small portion of a revolution because, as soon as the sliding bolt 14 comes opposite the fixed cam block 52, which is fixed to the frame of the machine, the bolt is pushed back thereby and the friction clutch is momentarily disengaged. During this disengagement, while the machine is moving under momentum, the extension 75 of the positive clutch pawl, which has been riding on the edge of the cam plate 76, reaches the recess 112 in the plate and the pawl 16 moves radially outwardly (to serve as the strut heretofore mentioned) and will engage the first of the teeth 78 that it encounters, these teeth (in the ring 20 in the flywheel 18) at this moment rotating faster than the hub 12, owing to slip occurring as the friction clutch is disengaged by the cam block 52. As soon as the sliding bolt 14 passes off the cam block 52, the friction clutch is reengaged and thereafter, during the cycle, both clutches are engaged until the pawl extension 75 reaches the edge 114 near the upper corner of the cam plate 76. This edge pushes the pawl gradually inwards and finally disengages the positive clutch. The friction clutch is disengaged slightly later as the end of the sliding bolt 14 reaches a wedge surface 54A on the fixed cam block 54. The momentum of the shaft and its connected parts is then sufficient to cause the hub to move round to the position of Fig. 2, in which the sliding bolt 14 is held out of operative position by the lower end of the lever 50.

After the positive clutch has been engaged, other sequences of the operation of the two clutches may be used, by suitably modifying the mechanisms, without departing from the spirit of the invention.

It will be appreciated that the illustrative construction provides definite advantages over stopping and starting mechanisms in which either a friction clutch or a positive clutch alone is employed. The friction clutch is brought into engagement at a time when the only load is to start the driven parts from rest (apart from the brake band which is light) and the positive clutch is brought into engagement when both the driving and driven parts are moving at nearly the same speeds giving, in consequence, a substantially shockless positive engagement which contributes to absence of noise and to long life of the positive driving parts. Furthermore, the positive clutch is maintained in engagement while the heavy load of cutting is encountered.

Having described the invention, what we claim as new and desire to secure by Letters Patent of the United States is:

1. A clutch mechanism for driving a machine having, in combination, a friction clutch, a positive clutch including a movable strut, means for engaging the friction clutch to start the machine, means for causing disengagement of the friction clutch, means to move the strut into operative position to cause engagement of the positive clutch during said disengagement and while the machine is moving under momentum, and means acting thereafter to move said strut out of operative position to disengage the positive clutch.

2. A clutch mechanism for driving a machine having, in combination, a friction clutch, a positive clutch including a pivoted pawl, manual means for engaging the friction clutch to start the machine, and automatic means to move the pawl into driving position to cause the engagement of the positive clutch at a predetermined time during a cycle of the machine.

3. A clutch mechanism for driving a machine having, in combination, a friction clutch, a positive clutch including a pivoted pawl, manual means for engaging the friction clutch to start the machine, and a stationary cam permitting movement of the pawl into driving position to cause engagement of the positive clutch at a predetermined time during a cycle of the machine.

4. A clutch mechanism having, in combination, a friction clutch, a positive clutch including a pivoted pawl, said clutches having common driving and driven members, means for engaging the friction clutch to start the driven member, means to disengage the friction clutch, means acting after said disengagement to move the pawl into driving position to engage the positive clutch, and means acting to disengage both clutches and permit the driven member to stop at the completion of its cycle.

5. A clutch mechanism for driving a machine having, in combination, a friction clutch, a positive clutch, means for engaging the friction clutch to start the machine, a stationary cam to disengage the friction clutch after the machine has been started, a second stationary cam to cause engagement of the positive clutch after said disengagement but while the machine is being driven by momentum, and cam means acting to cause disengagement of the positive clutch to permit the machine to come to a stop at the completion of its cycle.

6. A clutch mechanism having, in combination, a driving clutch member, a driven clutch member, a distortable member which may be distorted to form a frictional driving connection between said members, a movable member which can be positioned to form a positive driving connection between said clutch members, manual means to cause distortion of the distortable member to form said frictional driving connection to start the driven member, a fixed cam to cause opposite distortion of said member to disconnect the driving and driven members at a predetermined time during a cycle of the driven member, and a second fixed cam to cause thereafter said movable member to form said positive driving connection.

7. A clutch mechanism having, in combination, a driving clutch member, a driven clutch member, an expansible member which when expanded forms a frictional driving connection between said members, operating mechanism to cause expansion of the expansible member for starting the driven member frictionally, manual means to initiate operation of said operating mechanism, a fixed cam to contract said member and effect a disconnection of the driving and driven members at a predetermined time during a cycle of the driven member, a movable member which can be positioned to form a positive driving connection between said clutch members, and a second fixed cam acting after said disconnection to cause said movable member to form said positive driving connection.

8. A clutch mechanism having, in combination, a driving clutch member, a driven clutch member, a ring carried by the driven member and expansible into frictional driving connection with the driving member, ratchet teeth carried by the driving member, and a pawl carried by the driven member, said pawl being engageable with a ratchet tooth to form a positive driving connection between the driving and driven clutch members, said friction and positive driving connections operating in sequence first, to cause the frictional drive to drive the driven member for a definite portion of an operating cycle, second, to cause a disconnection between said members, and third, to cause the positive drive to drive the driven member during that portion of the cycle when it is operating under a heavier load.

9. A clutch mechanism for driving a machine having, in combination, a stationary frame, a driving clutch member, a driven clutch member, a friction connection arranged to operate between said members, a positive connection likewise arranged, manual means to operate the friction connection to start the driven member, and means fixed to the frame and acting in sequence automatically to disconnect the friction connection, then to connect the positive connection, then to reconnect the friction connection, then, when the machine is to be stopped, to disconnect both the positive connection and the friction connection to permit the driven machine to come to rest.

JOSEPH GOULDBOURN.
FRANK BYCROFT KEALL.